Jan. 11, 1927.  
W. J. FOX  
1,613,945  
MOTORCYCLE TRAILER ATTACHMENT  
Filed March 21, 1925   3 Sheets-Sheet 1

Inventor  
W. J. Fox  
By Jack A. Schley  
Attorney

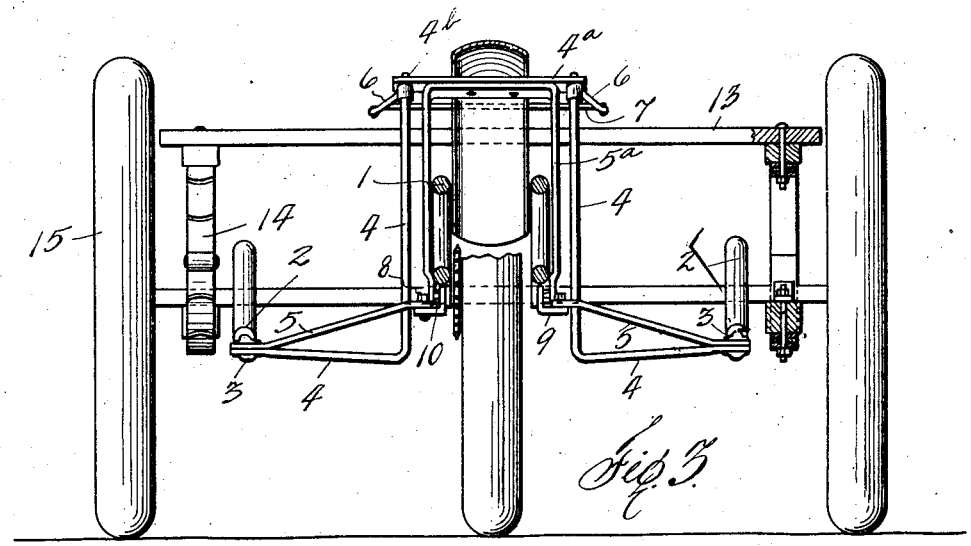
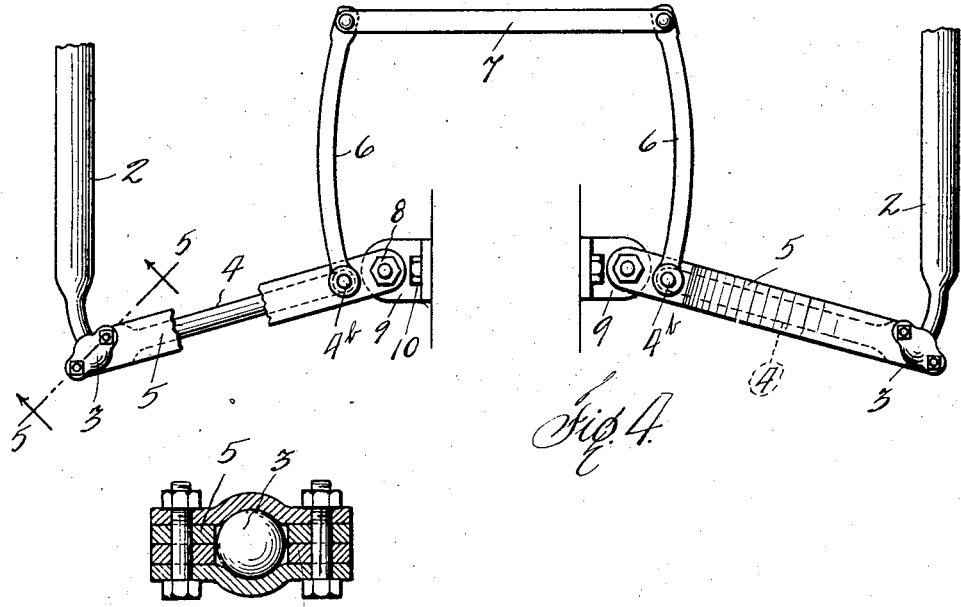

Jan. 11, 1927.

W. J. FOX 1,613,945

MOTORCYCLE TRAILER ATTACHMENT

Filed March 21, 1925   3 Sheets-Sheet 3

Inventor
W. J. Fox

By Jack Ashley

Attorney

Patented Jan. 11, 1927.

1,613,945

UNITED STATES PATENT OFFICE.

WERNER J. FOX, OF NEW ORLEANS, LOUISIANA.

MOTOR-CYCLE TRAILER ATTACHMENT.

Application filed March 21, 1925. Serial No. 17,231.

This invention relates to trailers and the attachments therefor, and refers more particularly to a device and attachment of this type for use with motorcycles.

An object of the invention is to provide a trailer and attachment which will stabilize the motorcycle, holding it upright when traveling in a plane and inclining it when making a curve.

Another object is the provision of the device which will make possible the utilization of maximum pulling power of a motorcycle.

A feature of the invention is the simplicity of construction and safety of operation.

Another advantage is the arrangement of the attachment which is such as to effect the center of gravity of the motorcycle and trailer attached in such a manner as to practically eliminate the overturning of the motorcycle on a curve.

Another object and feature will be set forth as well as the above in the course of the following description taken in connection with the annexed drawings in which:

Fig. 3 is a vertical section through the motorcycle wheel, looking rearwardly,

Figure 1:
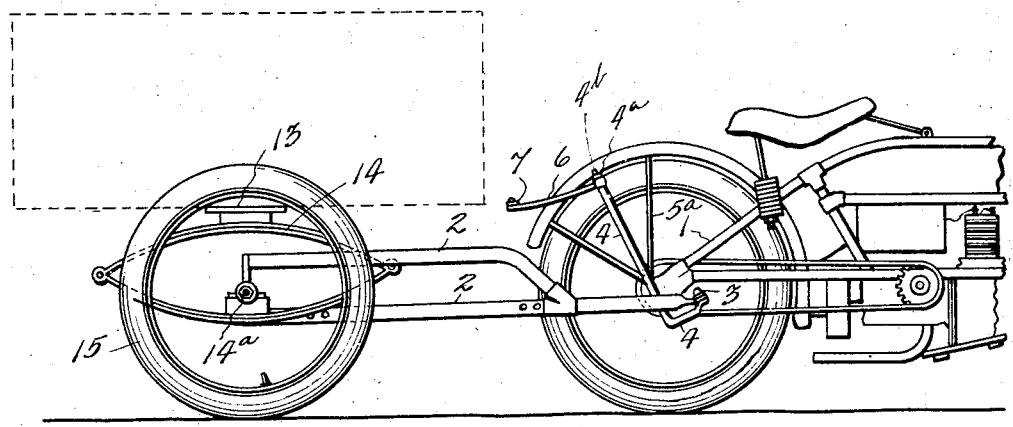
Fig. 1 represents a side elevation of the invention.
Figure 2:
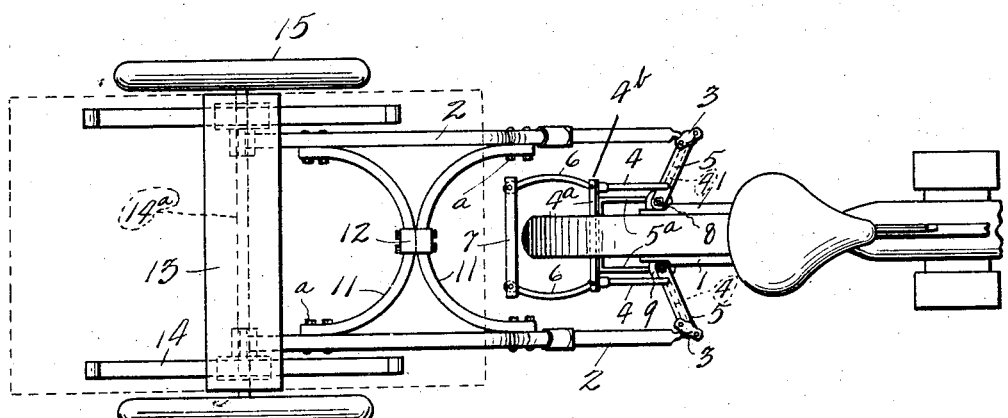
Fig. 2 shows a top or plan view.
Figure 6:
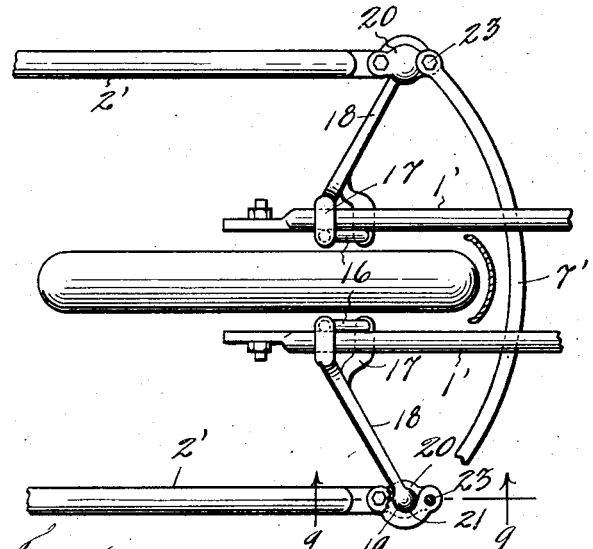
Figure 7:
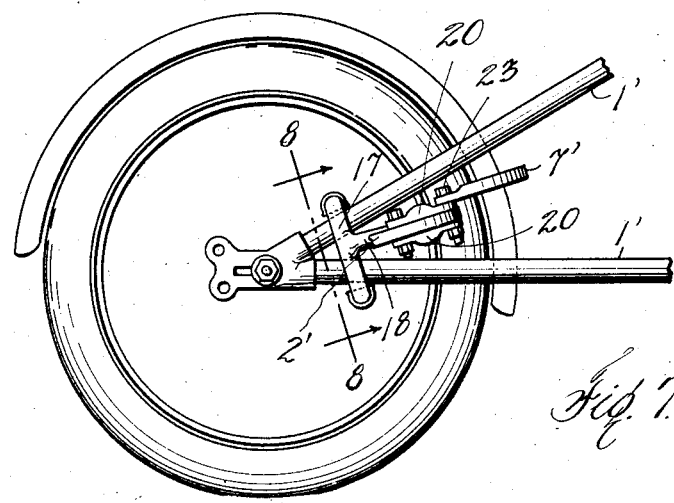
Figure 8:
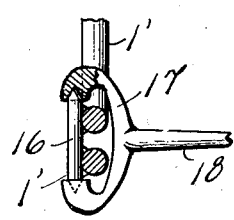
Figure 9:
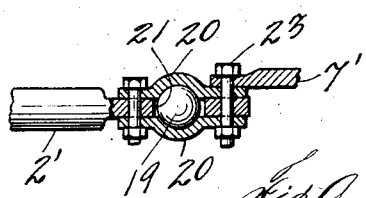

Fig. 4 is a detailed view of the assembly of parts making up the attachment means, Fig. 5 is a cross sectional view of the bearing between the attachment and the trailer reaches taken on line 5—5 in Figure 4 and viewed in the direction indicated by the arrows, Fig. 6 is a partial plan view of a modified form, Fig. 7 is a side elevation of the same, Fig. 8 is a sectional view on the line 8—8 of Fig. 7, and Fig. 9 is a sectional view on the line 9—9 of Fig. 6.

Continuing the description, 1 represents the frame of the motorcycle, 2—2 are the reaches of the trailer, 3—3 the ball and socket joints joining the reaches to 4—4, and members 5—5 of the device, or as I prefer to call it, the equalizer.

Cam levers 6—6 are secured at one of their ends to members 4—4 and at their other ends to connecting link 7.

The mudguard brace 5ª, has an attachment member 4ª, in the ends of which are journaled the ends of members 4—4.

Nut and bolt attachment 8 secures the member 5 to the stand stud 9 on each side of the rear end of the motorcycle, and a like attachment 10 secures the stand stud to the frame.

Between the reaches of the trailer frame are U-shaped braces 11—11, bolted to the reaches at a—a and joined together by an adjustable clamp 12 at their centers. The trailer body support 13 is secured on springs 14. The wheels 15 of the trailer are shown on axle 14ª.

It will be noted that the upper bearings, namely at 4ᵇ are located back of the lower bearings at 8 at the stand studs, at approximately an angle of thirty degrees.

The members 5—5 extend outward and forward on a horizontal plane from the rear hub of the motorcycle (about forty degrees forward).

In Figs. 6 to 9 inclusive I have shown a modified form in which the numeral 1′ designates the frame of a motorcycle having cone bearing posts 16 welded to the inner-side of the rear portion of the frame. A cone bearing yoke 17 has an outwardly inclined arm 18 having a ball 19 formed at its end engaging with a socket joint 20. The front portion of the reach 2′ is flattened and cut out at 21 adapted to receive the ball between the sockets 20. A connecting link 7′ is secured to the sockets and reaches by means of bolts 23 and has a similar function as the connecting link in the aforementioned form, causing a synchronizing motion of the arms 18.

In operation, upon completion of connections, the motorcycle is held in an upright position by the trailer, without other support. Traveling in a straight line, the motorcycle is afforded direct draft and is held in perpendicular position, and the center of gravity between the outer extremities of the device is in common with center of gravity of the motorcycle itself.

Making a turn to one side or the other causes the motorcycle to lean in the direction of the turn. This is due to the fact of the upper bearings of the device being located back of the lower bearings. At the same time, the center of gravity between the outer extremities of the device is ascertained to be in the opposite direction, due to the fact that the normal position of the outer extremities of the device is forward from the lower bearings, and the result of making a turn brings one extremity closer to the motorcycle, and at the same time moves the other extremity away from the motorcycle. Thus the operation of the motorcycle and trailer is synchronized to attain a perfect balance and to facilitate free operation of the motorcycle.

What I claim, is:

1. In a device for attaching the forward reaches of a trailer to a motorcycle, opposite sections each comprising a pair of bars, one of which extends rearwardly in a horizontal plane from a ball and socket connection with the forward reach of the trailer and vertically at an angle rearwardly to its pivotal mounting upon the rear end of the motorcycle, the other bar extending from the ball and socket connection to a pivotal mounting in a support attached to the motorcycle, an eccentric arm extending rearwardly from the second bar, and a connecting link pivoted to said arms of the opposite sections rearwardly of the motorcycle rear wheel.

2. In a device for attaching the forward reaches of a trailer to a motorcycle, opposite sections comprising a pair of bars, each bar connected at one end to a forward reach of the trailer by a ball and socket joint, one of the bars being pivoted at its opposite end to a stand stud secured adjacent the rear axle of the motorcycle, the other bar having a vertical member journalled in a cross support secured at the motor cycle mudguard, a lever arm secured to said member and extending rearwardly, a link connecting the arms of opposite sections, and braces between the reaches of the trailer.

3. In a combination trailer and stabilizer for motorcycles, means for attaching the trailer comprising a pair of horizontal arms extending forward at an angle from their pivotal attachment adjacent the rear axle of a motorcycle, angular rods extending horizontally from the trailer attachment and vertically through said arms to a pivotal mounting in a support rearwardly and above the rear motorcycle axle, levers secured to the vertical ends of the rods adjacent their bearing points in the support, and a connecting link securing the ends of said levers together.

4. In a device of the character described, the combination with a motorcycle and the reaches of a trailer, of a connecting attachment pivotally secured to the rear of the motorcycle and including pivoted connections with the reaches at its lower portion and an upper pivoted connection, the upper pivoted connection being relatively spaced rearwardly of the lower pivoted connections and extending to an opposite reach of the trailer.

5. In a device of the character described, the combination with a motorcycle and trailer reaches on each side of the motorcycle, of attaching members pivotally supported by the rear of the motorcycle and disposed at an angle to the perpendicular, the outer ends of said members being swiveled to the reaches.

6. In a device for attaching the forward reaches of a trailer to a motorcycle, rearwardly inclined bars at opposite sides pivoted to the reaches and motorcycle, and a link connecting said bars for simultaneous operation in opposite directions.

7. In a device for attachment to a motorcycle and the reaches of a trailer, rearwardly inclined members adapted to be pivoted upon the motorcycle, arms directed outwardly and forwardly from said members and arranged to swing therewith, swivel bearing devices at the outer ends of the arms for connection with the trailer reaches, and means for connecting the arms for operation in unison.

8. A device for attaching the forward reaches of a trailer to a motorcycle comprising a yielding connection extending transversely between the opposite reaches and the motorcycle frame constructed to permit a lateral shifting of the center of gravity of the motorcycle relative to the corresponding center of gravity of the trailer.

9. A device for attaching the forward reaches of a trailer to a motorcycle comprising a pivotal connection between the opposite reaches and the motorcycle frame constructed to transmit motion from one reach to an opposite reach and permit an inclination laterally of the motorcycle relative to the perpendicular position of the trailer.

10. A device for attaching the forward reaches of a trailer to a motorcycle comprising a laterally disposed yielding connection pivoted to the forward ends of the reaches and the rear portion of the motorcycle frame.

In testimony whereof I affix my signature.

WERNER J. FOX.